(12) United States Patent
Franke et al.

(10) Patent No.: US 10,384,525 B2
(45) Date of Patent: Aug. 20, 2019

(54) SYSTEMS FOR POWER INTEGRATION OF TURBINES, COMPRESSORS AND HYBRID ENERGY DEVICES WITH INTERNAL COMBUSTION ENGINES

(71) Applicant: FEV Europe GmbH, Aachen (DE)

(72) Inventors: Michael Franke, Rochester Hills, MI (US); Satyum Joshi, Auburn Hills, MI (US); Erik Koehler, Birmingham, MI (US); Mufaddel Z. Dahodwala, West Bloomfield, MI (US)

(73) Assignee: FEV Europe GmbH, Aachen (DE)

( * ) Notice: Subject to any disclaimer, the term of this patent is extended or adjusted under 35 U.S.C. 154(b) by 191 days.

(21) Appl. No.: 15/423,041

(22) Filed: Feb. 2, 2017

(65) Prior Publication Data

US 2018/0215246 A1 Aug. 2, 2018

(51) Int. Cl.
*B60K 6/365* (2007.10)
*F02B 37/10* (2006.01)
*F02B 39/06* (2006.01)
*F02B 39/12* (2006.01)
*F16D 49/08* (2006.01)
*B60K 6/12* (2006.01)
*F02G 5/00* (2006.01)
*F02B 39/10* (2006.01)

(Continued)

(52) U.S. Cl.
CPC .............. *B60K 6/12* (2013.01); *B60K 6/365* (2013.01); *B60K 6/445* (2013.01); *F02B 37/10* (2013.01); *F02B 39/06* (2013.01); *F02B 39/10* (2013.01); *F02B 39/12* (2013.01); *F02B 41/10* (2013.01); *F02B 63/04* (2013.01); *F02B 65/00* (2013.01); *F02G 5/00* (2013.01); *F16D 49/08* (2013.01); *F16H 1/28* (2013.01); *Y02T 10/144* (2013.01); *Y02T 10/16* (2013.01); *Y02T 10/163* (2013.01)

(58) Field of Classification Search
CPC  B60K 6/00–547; B60K 2006/123–542; F02B 39/04–12; F02B 37/00–24; F16H 1/28–48
See application file for complete search history.

(56) References Cited

U.S. PATENT DOCUMENTS

| | | | | |
|---|---|---|---|---|
| 3,238,713 A | * | 3/1966 | Wallace | F02B 37/105 |
| | | | | 123/561 |
| 3,673,797 A | * | 7/1972 | Wilkinson | F02B 37/105 |
| | | | | 60/39.17 |

(Continued)

FOREIGN PATENT DOCUMENTS

WO    2013004595 A1    1/2013

*Primary Examiner* — Laert Dounis

(57) ABSTRACT

A system for power integration is provided. The system for power integration includes a planetary gear system with a ring gear, a sun gear and a carrier. A supercharger compressor is mechanically coupled to the ring gear, a secondary turbine is mechanically coupled to the sun gear, and a hybrid energy device is mechanically coupled to the carrier. The system is configured for an internal combustion engine (ICE) to be mechanically coupled to the hybrid energy device through the carrier and a first clutch, and a brake may be mechanically coupled to the supercharger compressor via a band brake or second clutch. The system integrates power between the supercharger compressor, secondary turbine, hybrid energy device and ICE such that enhanced fuel economy is provided.

21 Claims, 7 Drawing Sheets

(51) Int. Cl.
*F02B 41/10* (2006.01)
*B60K 6/445* (2007.10)
*F02B 63/04* (2006.01)
*F02B 65/00* (2006.01)
*F16H 1/28* (2006.01)

(56) References Cited

U.S. PATENT DOCUMENTS

| | | | |
|---|---|---|---|
| 4,036,029 A * | 7/1977 | Francis | B60H 1/3223 |
| | | | 123/41.19 |
| 5,890,468 A * | 4/1999 | Ozawa | F02B 37/005 |
| | | | 123/561 |
| 6,681,575 B2 | 1/2004 | Dellora et al. | |
| 7,490,594 B2 | 2/2009 | Van Dyne et al. | |
| 7,958,727 B2 | 6/2011 | Arnold | |
| 8,261,550 B2 * | 9/2012 | Sartre | B60K 6/365 |
| | | | 60/607 |
| 8,490,393 B2 * | 7/2013 | Lofgren | F02B 37/105 |
| | | | 123/559.1 |
| 2001/0019980 A1 * | 9/2001 | Kanehisa | B60K 6/365 |
| | | | 475/5 |
| 2007/0149336 A1 * | 6/2007 | Sallstrom | B60K 6/485 |
| | | | 475/5 |
| 2013/0269342 A1 * | 10/2013 | Oh | F02B 33/00 |
| | | | 60/607 |
| 2014/0224228 A1 * | 8/2014 | Benjey | B60K 6/485 |
| | | | 123/559.3 |
| 2015/0064039 A1 * | 3/2015 | Nagai | F01C 1/02 |
| | | | 418/69 |
| 2015/0345379 A1 | 12/2015 | McDonald-Walker | |
| 2016/0017793 A1 * | 1/2016 | Johnson | F02B 39/10 |
| | | | 417/44.1 |
| 2016/0265652 A1 * | 9/2016 | Nishimine | B60K 6/48 |

* cited by examiner

SYSTEMS FOR POWER INTEGRATION OF TURBINES, COMPRESSORS AND HYBRID ENERGY DEVICES WITH INTERNAL COMBUSTION ENGINES

FIELD OF TECHNOLOGY

The present application is directed to systems for power integration, and particularly to systems for power integration of turbocompounding turbines, waste heat recovery turbines, supercharger compressors and electric or hydraulic hybrid components with internal combustion engines.

BACKGROUND

The desire to increase fuel efficiency of internal combustion engines is known. The use of turbochargers, turbocompounding turbines, waste heat recovery turbines, supercharging compressors and electric or hydraulic hybridization components to increase fuel efficiency of the internal combustion engines is also known. However, known technologies for increasing the fuel efficiency of internal combustion engines have limitations or shortcomings within certain speed and load ranges of internal combustion engines. Accordingly, a system for power integration that takes advantage of a given technology within an optimum speed and load range of an internal combustion engine would be desirable.

SUMMARY

A system for power integration is provided. The system for power integration includes a planetary gear system with a ring gear, a sun gear and a carrier. A supercharger compressor is mechanically coupled to the ring gear, a secondary turbine (e.g., a turbocompounding and/or waste heat recovery turbine) is mechanically coupled to the sun gear, and a hybrid energy device is mechanically coupled to the carrier. The system is configured for an internal combustion engine (ICE) to be mechanically coupled to the hybrid energy device through the carrier and a first clutch, and a brake may be mechanically coupled to the supercharger compressor via a band brake or second clutch. The system for power integration may have at least four-modes of power integration illustratively described herein as Mode A, Mode B, Mode C and Mode D1. In the Mode A, the band brake or second clutch is engaged such that the brake is mechanically coupled to the supercharger compressor, and the first clutch is disengaged such that the ICE is not mechanically coupled to the hybrid energy device. In mode B, the band brake or second clutch is engaged such that the brake is mechanically coupled to the supercharger compressor, and the first clutch is engaged such that the ICE is mechanically coupled to the hybrid energy device in a forward rotational direction. In Mode C, the band brake or second clutch is disengaged such that the brake is not mechanically coupled to the supercharger compressor, and the first clutch is disengaged such that the ICE is not mechanically coupled to the hybrid energy device. In Mode D1, the band brake or second clutch is disengaged such that the brake is not mechanically coupled to the supercharger compressor, and the first forward clutch is engaged and the first reverse clutch is disengaged such that the ICE is mechanically coupled to the hybrid energy device in a forward rotational direction. In embodiments, the first clutch may include a first forward clutch and a first reverse clutch and the system has at least one additional mode of power integration (Mode D2) in addition to Modes A, B, C and D1. In Mode D2, the band brake or second clutch is disengaged such that the brake is not mechanically coupled to the supercharger compressor, and the first forward clutch is disengaged and the first reverse clutch is engaged such that the ICE is mechanically coupled to the hybrid energy device in a reverse rotational direction. It is understood that in Modes A, B, C and D1 the first clutch may include the first forward clutch and the first reverse clutch with the first reverse clutch always disengaged such that the ICE is not mechanically coupled to the hybrid energy device in the reverse rotational direction.

In Mode A the system is configured for the secondary turbine to provide power to the hybrid energy device and may be employed, without limitation, during operation of an ICE under low loads (torque) and low to high speeds (RPM). In Mode B, the system is configured for the secondary turbine to provide power to the hybrid energy device and an ICE, and for the hybrid energy device to provide power to the ICE. Mode B may be employed, without limitation, during operation of an ICE under high loads and high speeds. In Mode C, the system is configured for the secondary turbine to provide power to the hybrid energy device and the supercharger compressor and may be employed, without limitation, during operation of an ICE under high loads and low speeds. In mode D1, the system is configured for the secondary turbine to provide power to the hybrid energy device, supercharger compressor and an ICE, and for the hybrid energy device to provide power to the ICE. Mode D1 may be employed, without limitation, during operation of an ICE under high loads and low speeds. In mode D2, the system is configured for the secondary turbine to provide power to the hybrid energy device and power to the supercharger compressor, and in the alternative or in addition to, an ICE may provide power to the hybrid energy device. Mode D2 may be employed, without limitation, during operation of an ICE under high loads and low speeds.

In other embodiments, a vehicle with a system for power integration includes an ICE, a supercharger compressor, a secondary turbine and a hybrid energy device. A planetary gear system with a ring gear, a sun gear and a carrier is also included. The supercharger compressor is mechanically coupled to the ring gear, the secondary turbine is mechanically coupled to the sun gear, the hybrid energy device is mechanically coupled to the carrier, and the ICE is mechanically coupled to the hybrid energy device via a first forward clutch and a first reverse clutch. A brake may be included and be mechanically coupled to the supercharger compressor via a band brake or second clutch. The vehicle with the system for power integration has a plurality of modes of operation. Particularly, The system for power integration may have at least four-modes of power integration illustratively described herein as Mode A, Mode B, Mode C and Mode D1. In the Mode A, the band brake or second clutch is engaged such that the brake is mechanically coupled to the supercharger compressor, and the first is disengaged such that the ICE is not mechanically coupled to the hybrid energy device. In mode B, the band brake or second clutch is engaged such that the brake is mechanically coupled to the supercharger compressor, and the first clutch is engaged such that the ICE is mechanically coupled to the hybrid energy device in a forward rotational direction. In Mode C, the band brake or second clutch is disengaged such that the brake is not mechanically coupled to the supercharger compressor, and the first clutch is disengaged such that the ICE is not mechanically coupled to the hybrid energy device. In Mode D1, the band brake or second clutch is disengaged such that the brake is not mechanically coupled to the supercharger compressor, and the first forward clutch is engaged and the first reverse clutch is disengaged such that the ICE is mechanically coupled to the hybrid energy device in a forward rotational direction. In embodiments, the first clutch may include a first forward clutch and a first reverse clutch and the system has at least one additional mode of power integration (Mode D2) in addition to Modes A, B, C and D1. In Mode D2, the band brake or second clutch is disengaged such that the brake is not mechanically coupled to the supercharger compressor, and the first forward clutch is disengaged and the first reverse clutch is engaged such that the ICE is mechanically coupled to the hybrid energy device in a reverse rotational direction. It is understood that in Modes A, B, C and D1 the first clutch may include the first forward clutch and the first reverse clutch with the first reverse clutch always disengaged such that the ICE is not mechanically coupled to the hybrid energy device in the reverse rotational direction.

In Mode A the system is configured for the secondary turbine to provide power to the hybrid energy device and may be employed, without limitation, during operation of the ICE under low loads (torque) and low to high speeds (RPM). In Mode B, the system is configured for the secondary turbine to provide power to the hybrid energy device and the ICE, and for the hybrid energy device to provide power to the ICE. Mode B may be employed, without limitation, during operation of the ICE under high loads and high speeds. In Mode C, the system is configured for the secondary turbine to provide power to the hybrid energy device and the supercharger compressor and may be employed, without limitation, during operation of the ICE under high loads and low speeds. In mode D1, the system is configured for the secondary turbine to provide power to the hybrid energy device, supercharger compressor and ICE, and for the hybrid energy device to provide power to the ICE. Mode D1 may be employed, without limitation, during operation of the ICE under high loads and low speeds. In mode D2, the system is configured for the secondary turbine to provide power to the hybrid energy device and power to the supercharger compressor, and in the alternative or in addition to, the ICE may provide power to the hybrid energy device. Mode D2 may be employed, without limitation, during operation of the ICE under high loads and low speeds.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
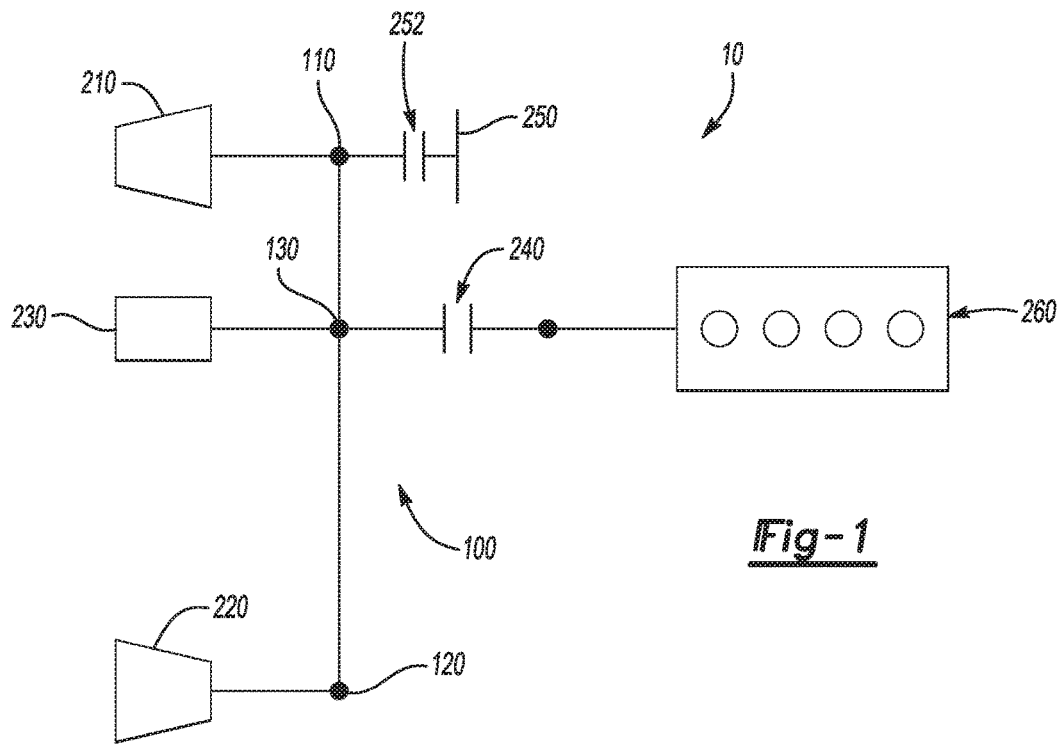
FIG. 1 schematically depicts a system for power integration according to one or more embodiments described and illustrated herein.

A system for power integration is provided. The system includes a planetary gear system with a ring gear, a sun gear and a carrier. A supercharger compressor is mechanically coupled to the ring gear, a secondary turbine is mechanically coupled to the sun gear, and a hybrid energy device is mechanically coupled to the carrier. It is understood that the hybrid energy device in the form of an electric motor/generator may serve as a motor and use electrical energy to rotate the carrier or serve as a generator and use rotation of the carrier to generate electrical energy. It is also understood that the hybrid energy device in the form of a variable displacement hydraulic pump can use hydraulic pressure to rotate the carrier or use rotation of the carrier to pressurize fluid. The system is configured for an internal combustion engine (ICE) to be mechanically coupled to the carrier and the hybrid energy device via a first clutch. The first clutch allows the ICE to be engaged to and disengaged from the carrier and the hybrid energy device. The hybrid energy device may serve as a torque modulator for the system by modulating power provided by the secondary turbine. For example and without limitation, if the hybrid energy device has excess available energy, the hybrid energy device may provide power to the supercharger compressor and/or the ICE. In the alternative, if the hybrid energy device is depleted of available energy, the hybrid energy device may receive power from the secondary turbine and/or ICE. A brake may be included in the system and be mechanically coupled to the supercharger compressor via a band brake or second clutch, i.e., the band brake or second clutch allows the brake to be engaged and disengaged from the ring gear and the supercharger compressor. When the brake is engaged with the supercharger compressor, the supercharger compressor does not rotate and supercharging (i.e., compressed air from the E-compressor) is not provided to an intake of the ICE. When the brake is disengaged from the supercharger, the supercharger compressor is free to rotate and supercharging may be provided to the intake of the ICE. In embodiments, the ICE may be mechanically coupled to the hybrid energy device through the carrier via a first forward clutch or a first reverse clutch. The first forward clutch, when engaged, mechanically couples the ICE to the carrier and the hybrid energy device in a forward rotational direction such that the system is configured for the hybrid energy device to provide power to the ICE. The first reverse clutch, when engaged, mechanically couples the ICE to the carrier and the hybrid energy device in a reverse rotational direction such that the system is configured for the ICE to provide power to the hybrid energy device. Various embodiments of systems for power distribution and power integration will be described in further detail herein with specific reference to the appended drawings.

As used herein, the term "mechanically coupled" refers to coupling or engagement between two components or devices such that rotation or lack of rotation of one component or device results in rotation or lack of rotation, respectively, of the other component or device. As used herein the term "hybrid energy device" refers to an electric motor/generator or a variable displacement hydraulic pump. As used herein, the term "band brake" refers to a band of friction material that tightens concentrically around a ring gear. As used herein, the term "secondary turbine" refers to a turbine downstream from a primary turbine such as a typical turbocharger turbine. Examples of a secondary turbine, without limitation, include a turbocompounding turbine and a waste heat recovery (WHR) turbine.

FIG. 1 generally depicts a system for power integration of a supercharger compressor, a secondary turbine, a hybrid energy device and an ICE. The system integrates power using a planetary gear system and one or more clutches. In embodiments, the planetary gear system may include a ring gear mechanically coupled to the supercharger compressor, a sun gear mechanically coupled to the secondary turbine and a carrier mechanically coupled to the hybrid energy device. The system is configured for the ICE to be mechanically coupled to the carrier and the hybrid energy device through a first clutch. A brake may be mechanically coupled to the supercharger compressor via a band brake or second clutch. Engagement and disengagement of the first clutch engages and disengages, respectively, the ICE from the carrier and hybrid energy device. Engagement and disengagement of the band brake or second clutch engages and disengages, respectively, the brake from the supercharger compressor. Engagement of the first clutch, the band brake or second clutch or the first clutch and the band brake or second clutch allows for integration of power between the secondary turbine, hybrid energy device, supercharger compressor and ICE as discussed in greater detail below.

Referring now to FIG. 1, embodiments of a system for power integration are shown generally at reference numeral 10. The system 10 includes a planetary gear system 100, a supercharger compressor 210, a secondary turbine 220 and a hybrid energy device 230. The planetary gear system 100 may include a ring gear 110, a sun gear 120 and a carrier 130. The supercharger compressor 210 may be mechanically coupled to the ring gear 110, the secondary turbine 220 may be mechanically coupled to the sun gear 120 and the hybrid energy device 230 may be mechanically coupled to the carrier 130. The system 10 is configured for an ICE 260 to be mechanically coupled to the carrier 130 and thus also mechanically coupled to the hybrid energy device 230 via a first clutch 240. That is, when the first clutch 240 is engaged, the ICE 260 is mechanically coupled with the carrier 130 and when the first clutch 240 is disengaged, the ICE 260 is not mechanically coupled to the carrier 130. A brake 250 may be included and be mechanically coupled to the ring gear 110, and thus mechanically coupled to the supercharger compressor 210, via a band brake or second clutch 252. That is, when the band brake or second clutch 252 is engaged, the brake 250 is mechanically coupled with the supercharger compressor 210 and the supercharger compressor 210 is prevented from rotating, and when the band brake or second clutch 252 is disengaged, the brake 250 is not mechanically coupled to the supercharger compressor 210 and the supercharger compressor 210 is free to rotate. The hybrid energy device 230 may serve as a torque modulator for the system 10 by modulating power provided by the secondary turbine 220. For example and without limitation, if the hybrid energy device 230 has excess available energy, the hybrid energy device 230 may provide power to the supercharger compressor 210 and/or the ICE 260. In the alternative, if the hybrid energy device is depleted of available energy, the hybrid energy device 230 may receive power from the secondary turbine 220 and/or ICE 260. It is understood that when the supercharger compressor 210 rotates, the supercharger compressor compresses air for the intake of the ICE 260.

While FIG. 1 depicts the system 10 with a single clutch (first clutch 240) between the hybrid energy device 230 and the ICE 260, other configurations may be used for a system for power integration as described in greater detail below.

Figure 2:
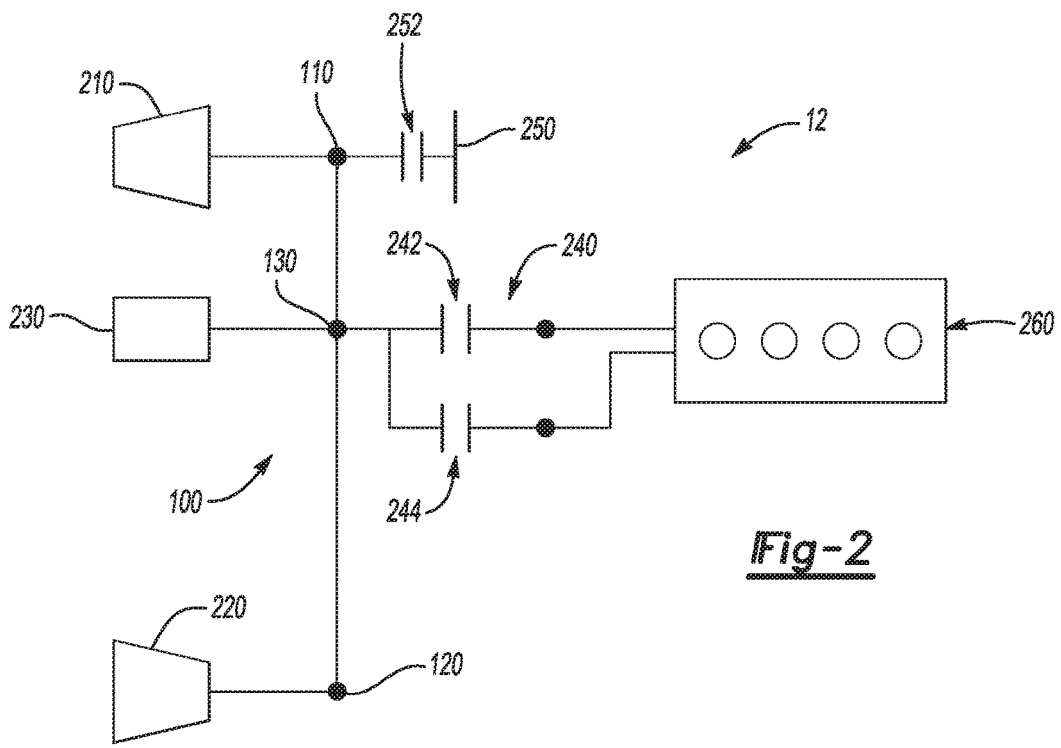
FIG. 2 schematically depicts a system for power integration according to one or more embodiments described and illustrated herein.

Referring now to FIG. 2, embodiments of a system for power integration are schematically depicted at reference numeral 12. The system 12 is similar to the system 10 described above except a first clutch includes a first forward clutch and a first reverse clutch. Particularly, the system 12 includes a planetary gear system 100, a supercharger compressor 210, a secondary turbine 220 and a hybrid energy device 230. The planetary gear system 100 may include a ring gear 110, a sun gear 120 and a carrier 130. The supercharger compressor 210 may be mechanically coupled to the ring gear 110, the secondary turbine 220 may be mechanically coupled to the sun gear 120 and the hybrid energy device 230 may be mechanically coupled to the carrier 130. The system 12 is configured for an ICE 260 to be mechanically coupled to the carrier 130 and thus also mechanically coupled to the hybrid energy device 230 via a first forward clutch 242 and a first reverse clutch 244. That is, the first clutch 240 includes the first forward clutch 242 and the first reverse clutch 244. The first forward clutch 242, when engaged, mechanically couples the ICE 260 to the carrier 130 and hybrid energy device 230 in a forward rotational direction. The first reverse clutch 244, when engaged, mechanically couples the ICE 260 with the carrier 130 and hybrid energy device 230 in a reverse rotational direction. When the first forward clutch 242 and first reverse clutch 244 are both disengaged, the ICE is not mechanically coupled to the carrier 130 and hybrid energy device 230. A brake 250 may be included and be mechanically coupled to the ring gear 110, and thus mechanically coupled to the supercharger compressor 210, via a band brake or second clutch 252. That is, when the band brake or second clutch 252 is engaged, the brake 250 is mechanically coupled with the supercharger compressor 210 and the supercharger compressor 210 is prevented from rotating, and when the band brake or second clutch 252 is disengaged, the brake 250 is not mechanically coupled to the supercharger compressor 210 and the supercharger compressor 210 is free to rotate. The hybrid energy device 230 may serve as a torque modulator for the system 12 by modulating power provided by the secondary turbine 220. For example and without limitation, if the hybrid energy device 230 has excess available energy, the hybrid energy device 230 may provide power to the supercharger compressor 210 and/or the ICE 260. In the alternative, if the hybrid energy device is depleted of available energy, the hybrid energy device 230 may receive power from the secondary turbine 220 and/or ICE 260.

System 10 and 12 provide various configurations, referred to herein as "modes", modes of operation, etc., such that different combinations of power integration between the supercharger compressor 210, secondary turbine 220, hybrid energy device 230 and ICE 260 are provided. Such modes are described in greater detail below.

Figure 3:
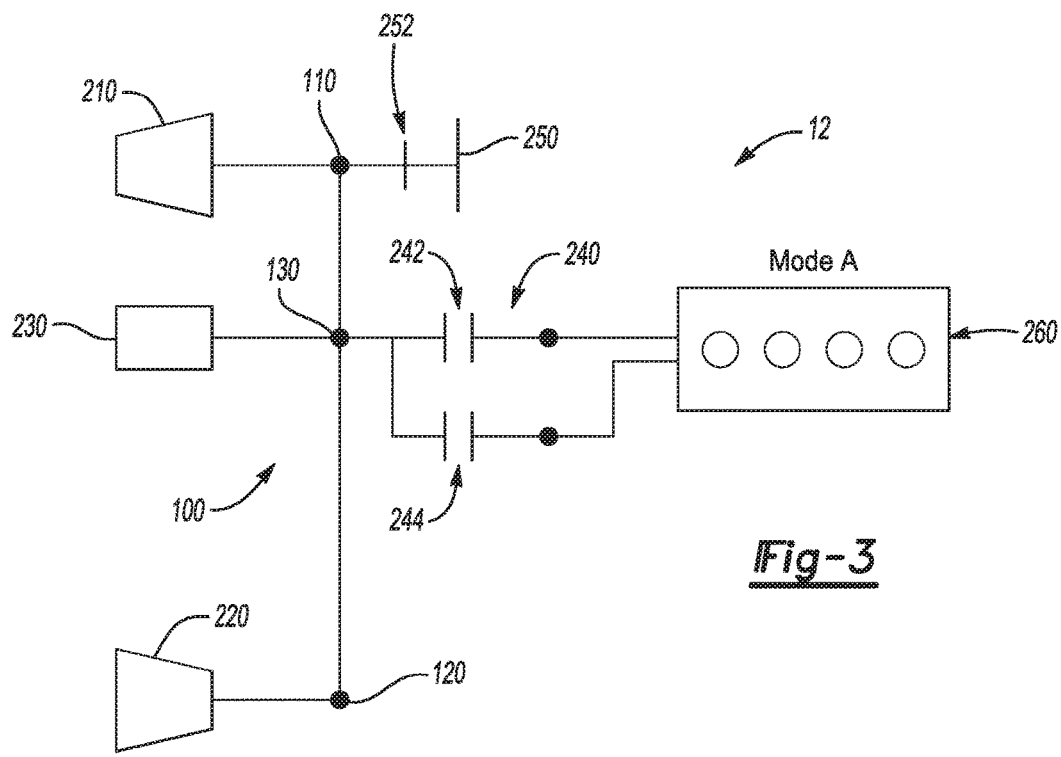
FIG. 3 schematically depicts "Mode A" for the system of power integration of FIG. 2.
Figure 4:
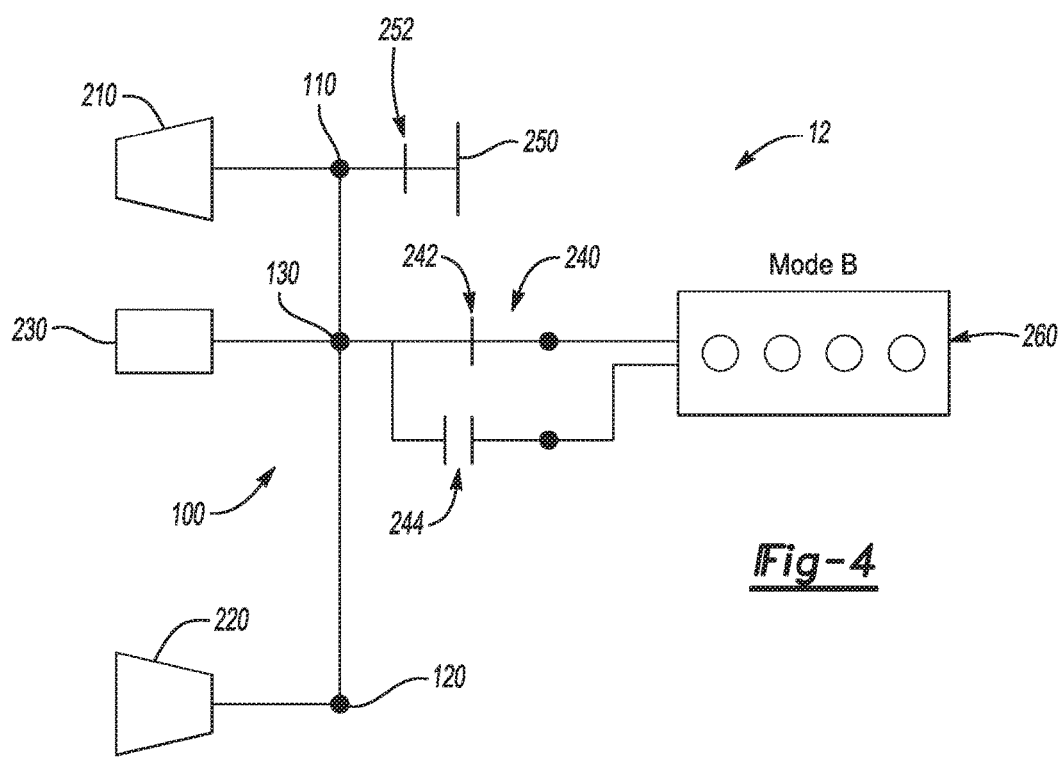
FIG. 4 schematically depicts "Mode B" for the system of power integration of FIG. 2.
Figure 5:
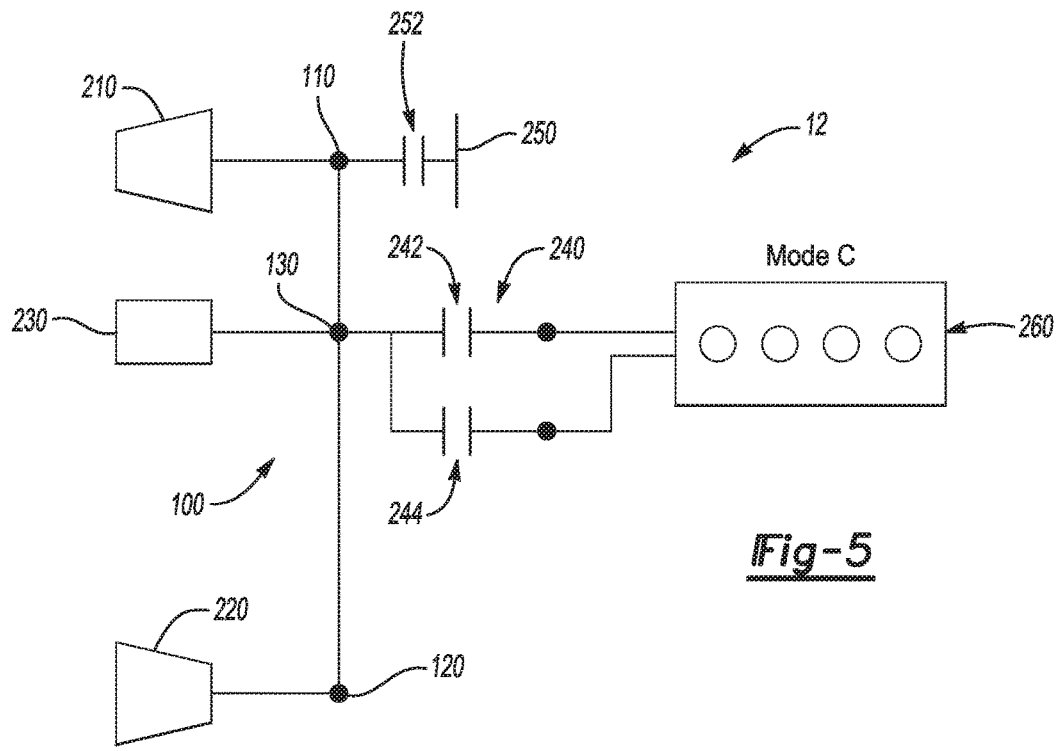
FIG. 5 schematically depicts "Mode C" for the system of power integration of FIG. 2.
Figure 6:
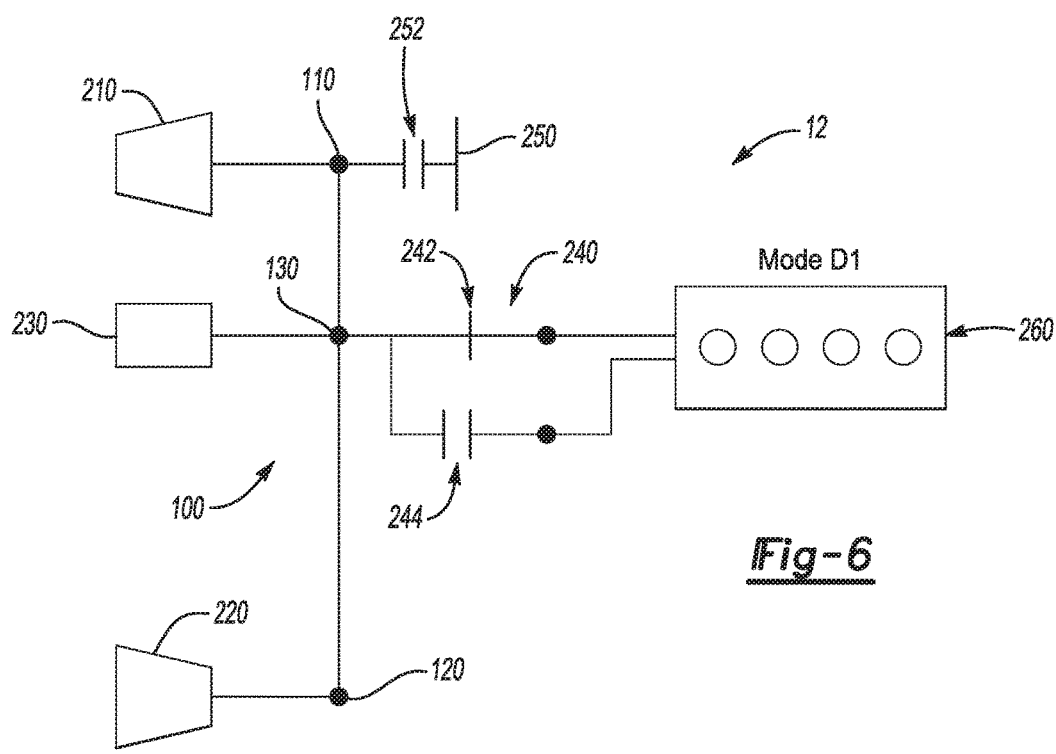
FIG. 6 schematically depicts "Mode D1" for the system of power integration of FIG. 2.
Figure 7:
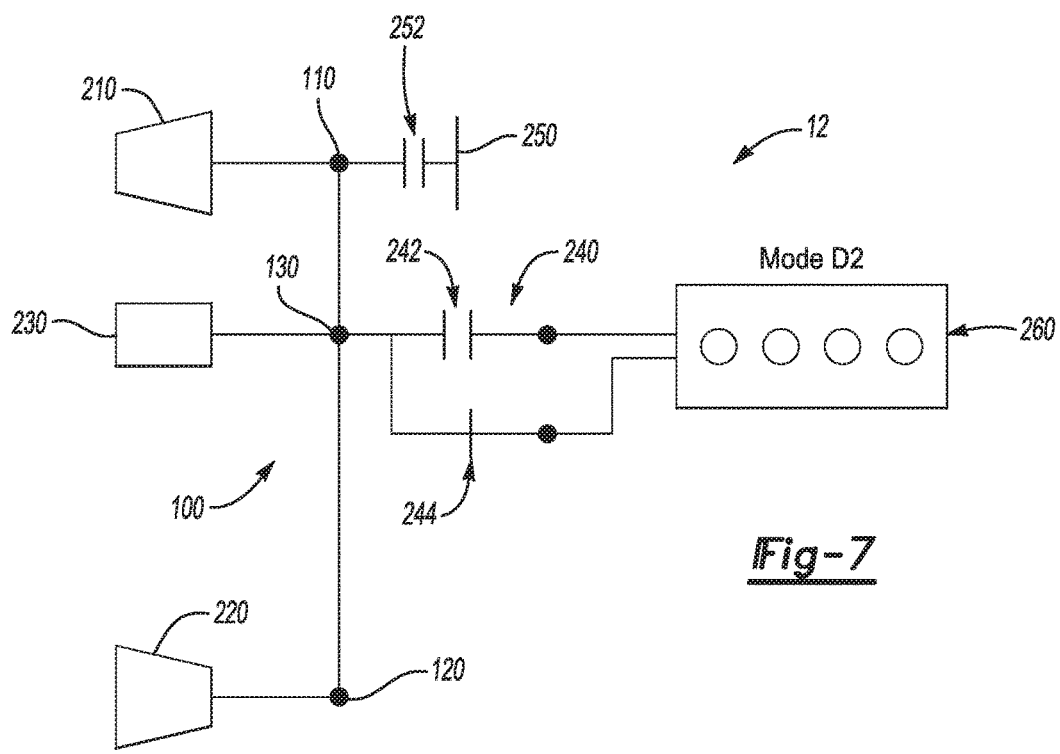
FIG. 7 schematically depicts "Mode D2" for the system of power integration of FIG. 2.

Referring now to FIGS. 1-7, five modes are illustratively depicted for the systems 10 and 12. The system 10 with the first clutch 240 may be configured in at least four modes illustratively referred to as: Mode A, Mode B, Mode C and Mode D1. The system 12 with the first forward clutch 242 and the first reverse clutch 244 may be configured in at least five modes illustratively referred to as: Mode A, Mode B, Mode C, Mode D1 and Mode D2. Mode A is depicted in FIG. 3, a Mode B is depicted in FIG. 4, a Mode C is depicted in FIG. 5, a Mode D1 is depicted in FIG. 6 and a Mode D2 is depicted in FIG. 7. It is understood that in Modes A, B, C, D1 (FIGS. 3-6), the first reverse clutch 244 is disengaged and thus the first forward clutch 242 is equivalent to the first clutch 240, i.e., the first reverse clutch 244 plays no role and is not needed in Modes A, B, C and D1, and thus the first forward clutch 242 may be replaced with the first clutch 240. However, in FIG. 7 the first reverse clutch 244 is engaged and is needed for the Mode D2 configuration.

In Mode A (FIG. 3), the band brake or second clutch 252 may be engaged such that the brake 250 is mechanically coupled to the supercharger compressor 210. For system 10, the first clutch 240 is disengaged, while for system 12 the first forward clutch 242 and the first reverse clutch 244 are disengaged, such that the ICE 260 is not mechanically coupled to the hybrid energy device 230. That is, although FIG. 3 depicts the system 12 with the first forward clutch 242 and the first reverse clutch 244 disengaged, the system 10 may be represented in FIG. 3 by substituting the first forward clutch 242 and the first reverse clutch 244 with the first clutch 240 depicted in FIG. 1 disengaged. The systems 10, 12 in Mode A are configured for the secondary turbine 220 to provide power to the hybrid energy device 230. It is understood that providing power to the hybrid energy device 230 allows the hybrid energy device to generate and store energy, e.g., using an energy storage device 232 (FIG. 9) such as a battery or hydraulic accumulator. Mode A is advantageous at low to high speeds (revolutions per minute (RPM)) and low loads of the ICE 260 since the power produced by the secondary turbine 220 is low and coupling the ICE 260 to the hybrid energy device 230 and hence to the secondary turbine 220 will induce frictional drag on the ICE 260. Also the speed of the secondary turbine 220 can be adjusted using hybrid energy device 230 to run the secondary turbine 220 at maximum efficiency.

In Mode B (FIG. 4), the band brake or second clutch 252 may be engaged such that the brake 250 is mechanically coupled to the supercharger compressor 210. For system 10, the first clutch 240 is engaged, while for system 12 the first forward clutch 242 is engaged and the first reverse clutch 244 is disengaged, such that the ICE 260 is mechanically coupled to the hybrid energy device 230 in a forward rotational direction. That is, although FIG. 4 depicts the system 12 with the first forward clutch 242 engaged and the first reverse clutch 244 disengaged, the system 10 may be represented in FIG. 4 by substituting the first forward clutch 242 engaged and the first reverse clutch 244 disengaged with the first clutch 240 depicted in FIG. 1 engaged. The systems 10, 12 in Mode B are configured for the secondary turbine 220 to provide power to the hybrid energy device 230 and the ICE 260. Particularly, in embodiments, the secondary turbine 220 provides power to the hybrid energy device 230. In other embodiments, the secondary turbine 220 provides power to the ICE 260. In still other embodiments, the secondary turbine 220 provides power to the hybrid energy device 230 and the ICE 260. In still yet other embodiments, the hybrid energy device 230 provides power to ICE 260 and secondary turbine 220 provides power to ICE 260. Mode B is advantageous at high speeds and high loads of the ICE 260 since at high power output of the secondary turbine 220, direct transfer of power from secondary turbine 220 to ICE 260 through mechanical coupling may be be a most efficient method of integration.

In Mode C (FIG. 5), the band brake or second clutch 252 may be disengaged such that the brake 250 is not mechanically coupled to the supercharger compressor 210. For system 10, the first clutch 240 is disengaged, while for system 12 the first forward clutch 242 and the first reverse clutch 244 are disengaged, such that the ICE 260 is not mechanically coupled to the hybrid energy device 230. That is, although FIG. 5 depicts the system 12 with the first forward clutch 242 and the first reverse clutch 244 disengaged, the system 10 may be represented in FIG. 5 by substituting the first forward clutch 242 and the first reverse clutch 244 disengaged with the first clutch 240 depicted in FIG. 1 disengaged. The systems 10, 12 in Mode C are configured for the secondary turbine 220 to provide power to the hybrid energy device 230 and the supercharger compressor 210. Particularly, in embodiments, the secondary turbine 220 provides power to the supercharger compressor 210. In other embodiments, the secondary turbine 220 and hybrid energy device 230 provide power to the supercharger compressor 210. Mode C is advantageous at low speeds and high loads of the ICE 260 since energy from the secondary turbine 220 which may be powered by waste heat energy in the exhaust may be directly used to run the supercharger compressor 210.

In Mode D1 (FIG. 6), the band brake or second clutch 252 may be disengaged such that the brake 250 is not mechanically coupled to the supercharger compressor 210. For system 10, the first clutch 240 is engaged, while for system 12 the first forward clutch 242 is engaged and the first reverse clutch 244 is disengaged, such that the ICE 260 is mechanically coupled to the hybrid energy device 230 in a forward rotational direction. That is, although FIG. 6 depicts the system 12 with the first forward clutch 242 engaged and the first reverse clutch 244 disengaged, the system 10 may be represented in FIG. 6 by substituting the first forward clutch 242 engaged and the first reverse clutch 244 disengaged with the first clutch 240 depicted in FIG. 1 engaged. The systems 10, 12 in Mode D1 are configured for the secondary turbine 220 to provide power to the hybrid energy device 230, the supercharger compressor 210 and the ICE 260. Particularly, in embodiments, the secondary turbine 220 provides power to the hybrid energy device 230. In other embodiments, the secondary turbine 220 provides power to the supercharger compressor 210. In still other embodiments, the secondary turbine 220 provides power to the ICE 260. In still other embodiments, the secondary turbine 220 provides power to the hybrid energy device 230 and the supercharger compressor 210. In other embodiments, the secondary turbine 220 provides power to the hybrid energy device 230 and the ICE 260. In still other embodiments, the secondary turbine 220 provides power to the supercharger compressor 210 and the ICE 260. In still yet other embodiments, the secondary turbine 220 provides power to the hybrid energy device 230, the supercharger compressor 210 and the ICE 260. In still yet other embodiments, the hybrid energy device 230 provides power to the ICE 260 and the secondary turbine 220 provides power to ICE 260 and supercharger compressor 210. Mode D1 is advantageous at low speeds and high loads of the ICE 260 if secondary turbine 220 power is high such that the power can be directly transmitted with high efficiency to the ICE 260 through the first forward clutch 242 in system 10 and through the first forward clutch 24w in system 12.

In Mode D2, the band brake or second clutch 252 may be disengaged such that the brake 250 is not mechanically coupled to the supercharger compressor 210, and the first forward clutch 242 is disengaged and the first reverse clutch 244 is engaged such that the ICE 260 is mechanically coupled to the hybrid energy device 230 in a reverse rotational direction. As noted above, since the first reverse clutch 244 is engaged in Mode D2, the system 10 may not be configured in Mode D2. The system 12 in Mode D2 is configured for the secondary turbine 220 to provide power to the hybrid energy device 230 and the supercharger compressor 210, and for the ICE 260 to provide power to the hybrid energy device 230 and supercharger compressor 210. Particularly, in embodiments, the secondary turbine 220 and the ICE 260 provide power to the hybrid energy device 230. In other embodiments, the secondary turbine 220 and the ICE 260 provide power to the hybrid energy device 230 and the secondary turbine 220 provides power to the supercharger compressor 210. Mode D2 is advantageous at low speeds and high loads of the ICE 260 if power from the secondary turbine 220 is less than power required by the supercharger compressor 210 and the ICE 260 needs to operate at low speeds and high loads for a long time period. Power from the ICE 260 can be directly transmitted through the first reverse clutch 244 to the supercharger compressor 210 with high efficiency.

Figure 8:
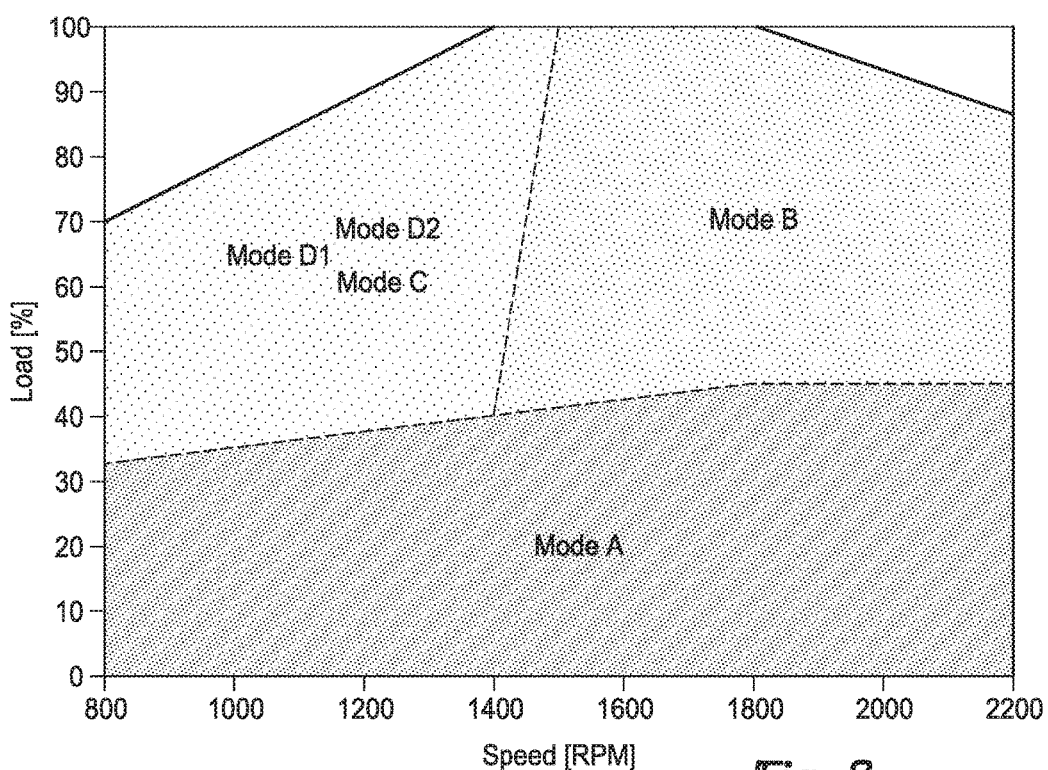
FIG. 8 graphically depicts regions of speed and load on a load versus speed map for Modes A-D2 depicted in FIGS. 2-7.

Referring now to FIG. 8, a graphical depiction of regions where Modes A-D2 depicted in FIGS. 3-7 are desired on a speed versus load map for an internal combustion engine is shown. Particularly, Mode A may be used for normalized engine speeds between about 0-100% (0%=idle and 100%=governed (full) speed) and normalized engine loads between about 0-30% (full load=100%). Mode B may be used for normalized engine speeds between about 43-100% and normalized loads between about 35-100%. Mode C, D1 and D2 may be used for normalized engine speeds between about 0-50% and normalized loads between about 30-100%.

It is understood that using the Modes A-D1 of the system 10 and Modes A-D2 of system 12 described above at the speeds and loads depicted in FIG. 8 provides enhanced fuel economy of the ICE 260. That is, the systems 10, 12 optimize the integration of the supercharger compressor 210, secondary turbine 220 and hybrid energy device 230 with the ICE 260 at least partially by employing the supercharger compressor 210, secondary turbine 220 and hybrid energy device 230 within predefined speeds and loads of the ICE 260. It is also understood that the range of speeds and loads for Modes A-D2 may vary depending on actual ICE employing the systems 10 and/or 12, the design criteria for combined ICE/systems 10 and/or 12, and the like.

Figure 9:
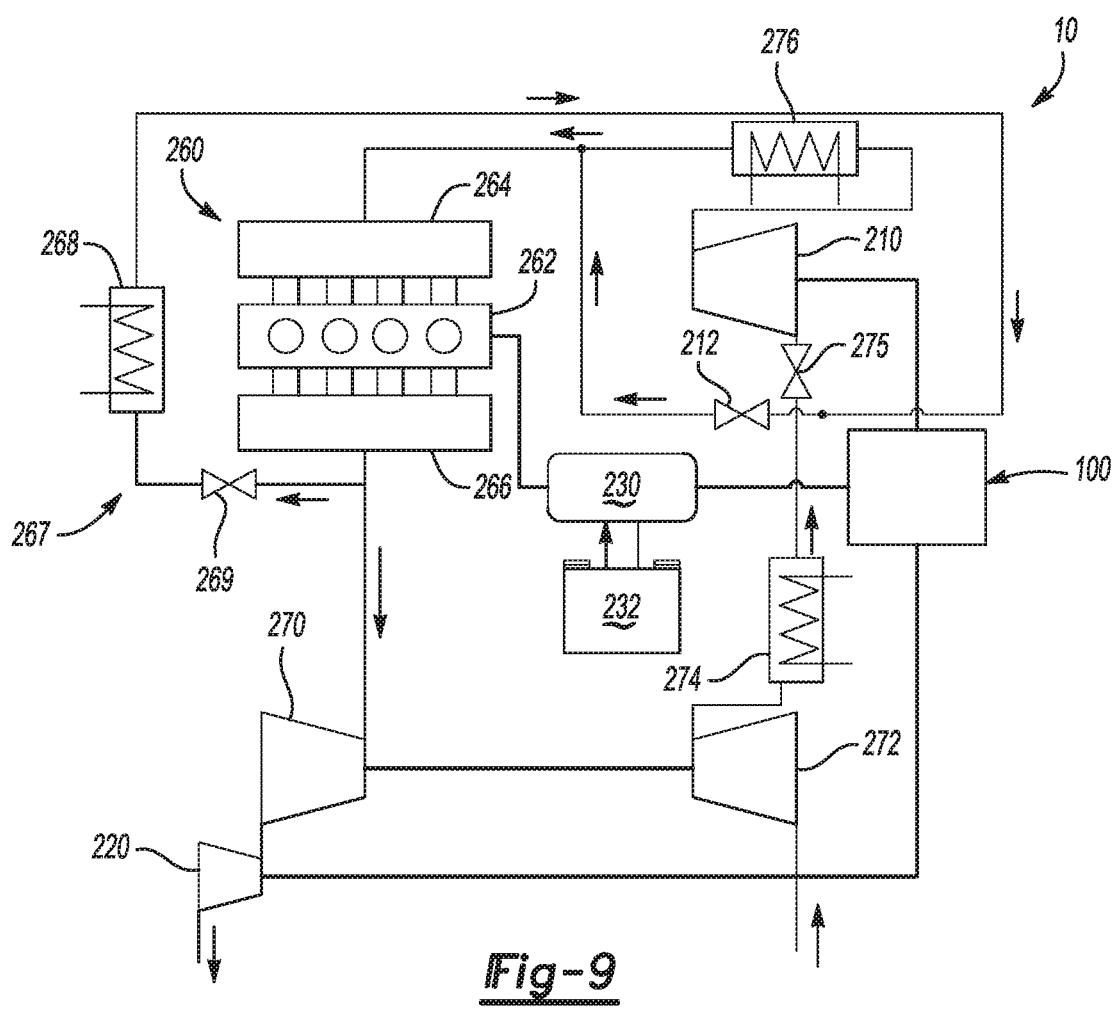
FIG. 9 schematically depicts a system for power integration according to one or more embodiments described and illustrated herein.

Referring now to FIG. 9, embodiments of the systems 10, 12 for power integration are schematically depicted with additional components or devices typically included with the ICE 260. Particularly, the systems 10, 12 include the planetary gear system 100, supercharger compressor 210, secondary turbine 220 and hybrid energy device 230. The ICE 260 has an engine block 262 with pistons and cylinders (not numbered in FIG. 9), an intake manifold 264 and an exhaust manifold 266. An exhaust gas recirculation (EGR) system 267 may be included with an EGR cooler 268. An EGR valve 269 may monitor and adjust an amount of exhaust gas from the exhaust manifold 266 that passes through the EGR system 267 or flows to a primary turbine 270. Downstream from the primary turbine 270 is the secondary turbine 220. Coupled to the primary turbine 270 may be a primary compressor 272 which may be in communication with a compressed air cooler 274, a supercharger compressor bypass valve 212 and the supercharger compressor 210. Downstream from the supercharger compressor 210 may be a second compressed air cooler 276. An energy storage device 232 may be connected with the hybrid energy device 230 and the hybrid energy device may be mechanically coupled to the ICE 260 as discussed above. In embodiments, the hybrid energy device 230 is an electric motor/generator and the energy storage device 232 is a battery. In other embodiments, the hybrid energy device 230 is a variable displacement hydraulic pump and the energy storage device 232 is a hydraulic accumulator.

Figure 10:
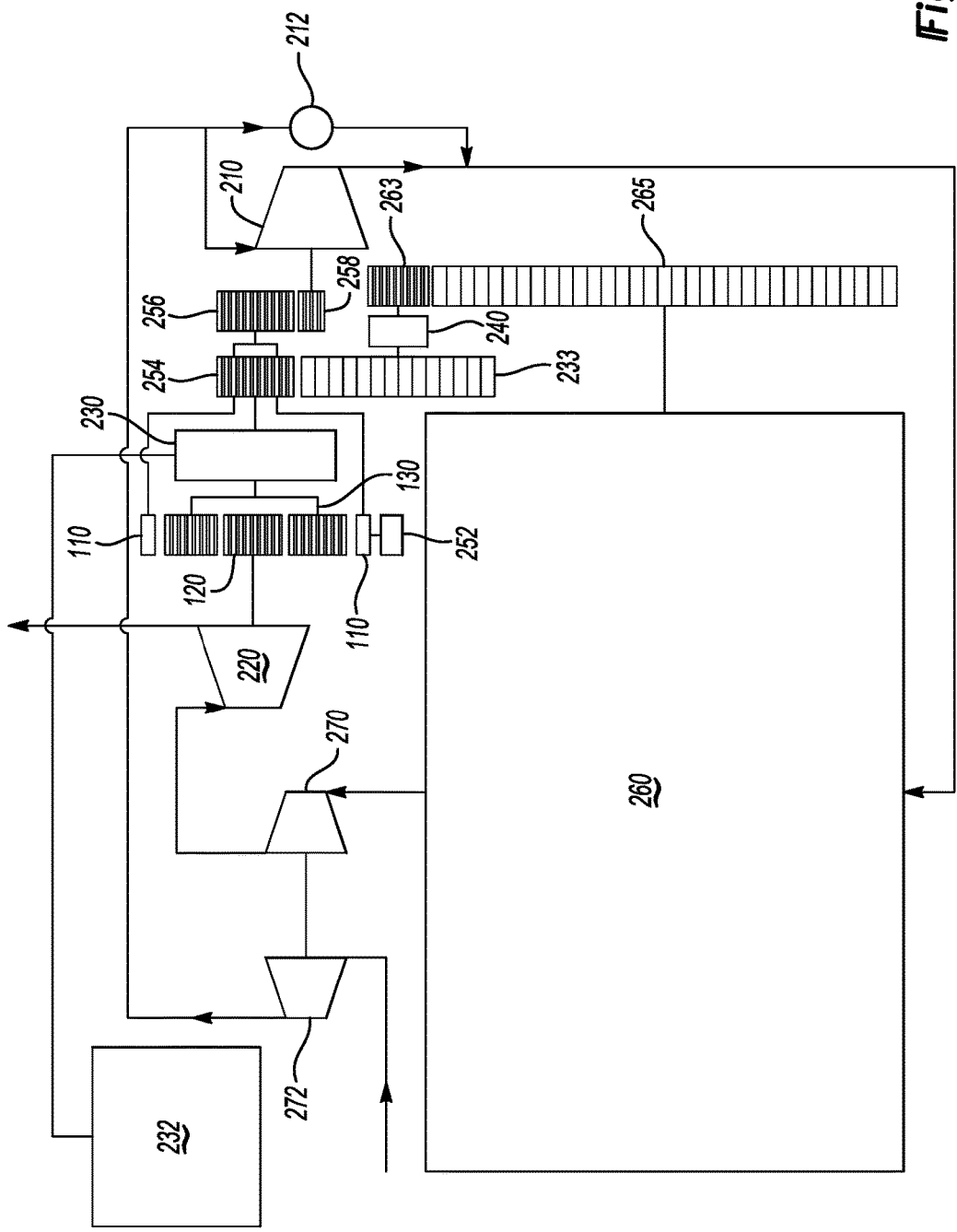
FIG. 10 schematically depicts a system for power integration according to one or more embodiments described and illustrated herein.

Referring now to FIG. 10, embodiments of the system 10 for power integration with additional mechanical linkage components are depicted. Particularly, the system 10 includes a planetary gear system 100, a supercharger compressor 210, a secondary turbine 220 and a hybrid energy device 230. The planetary gear system 100 may include a ring gear 110, a sun gear 120 and a carrier 130. The supercharger compressor 210 may be mechanically coupled to the ring gear 110, the secondary turbine 220 may be mechanically coupled to the sun gear 120 and the hybrid energy device 230 may be mechanically coupled to the carrier 130. The system 10 is configured for an ICE 260 to be mechanically coupled to the carrier 130 and thus also mechanically coupled to the hybrid energy device 230 via a first clutch 240. That is, when the first clutch 240 is engaged, the ICE 260 is mechanically coupled with the carrier 130 and when the first clutch 240 is disengaged, the ICE 260 is not mechanically coupled to the carrier 130. A brake 250 (not shown in FIG. 10) may be included and be mechanically coupled to the ring gear 110, and thus mechanically coupled to the supercharger compressor 210, via a band brake or second clutch 252. That is, when the band brake or second clutch 252 is engaged, the brake 250 is mechanically coupled with the supercharger compressor 210 and the supercharger compressor 210 is prevented from rotating, and when the band brake or second clutch 252 is disengaged, the brake 250 is not mechanically coupled to the supercharger compressor 210 and the supercharger compressor 210 is free to rotate. Positioned between the supercharger compressor 210, secondary turbine 220, hybrid energy device 230, first clutch 240, brake 250 and ICE 260 may be a plurality of gears, shafts, etc., that provide desired gear ratios between the various components of the system 10. For example and without limitation, positioned between the ring gear 110 and the supercharger compressor 210 may be a central linkage gear 254, a ring linkage gear 256 and a compressor linkage gear 258. Positioned between the carrier 130 and the first clutch 240 may be the central linkage gear 254 and a forward clutch gear 233. Positioned between the first clutch 240 and the ICE 260 may be a flywheel gear 263 and a flywheel 265. The supercharger compressor bypass valve 212 may also be provided to provide a bypass of compressed air from the primary compressor 270.

Figure 11:
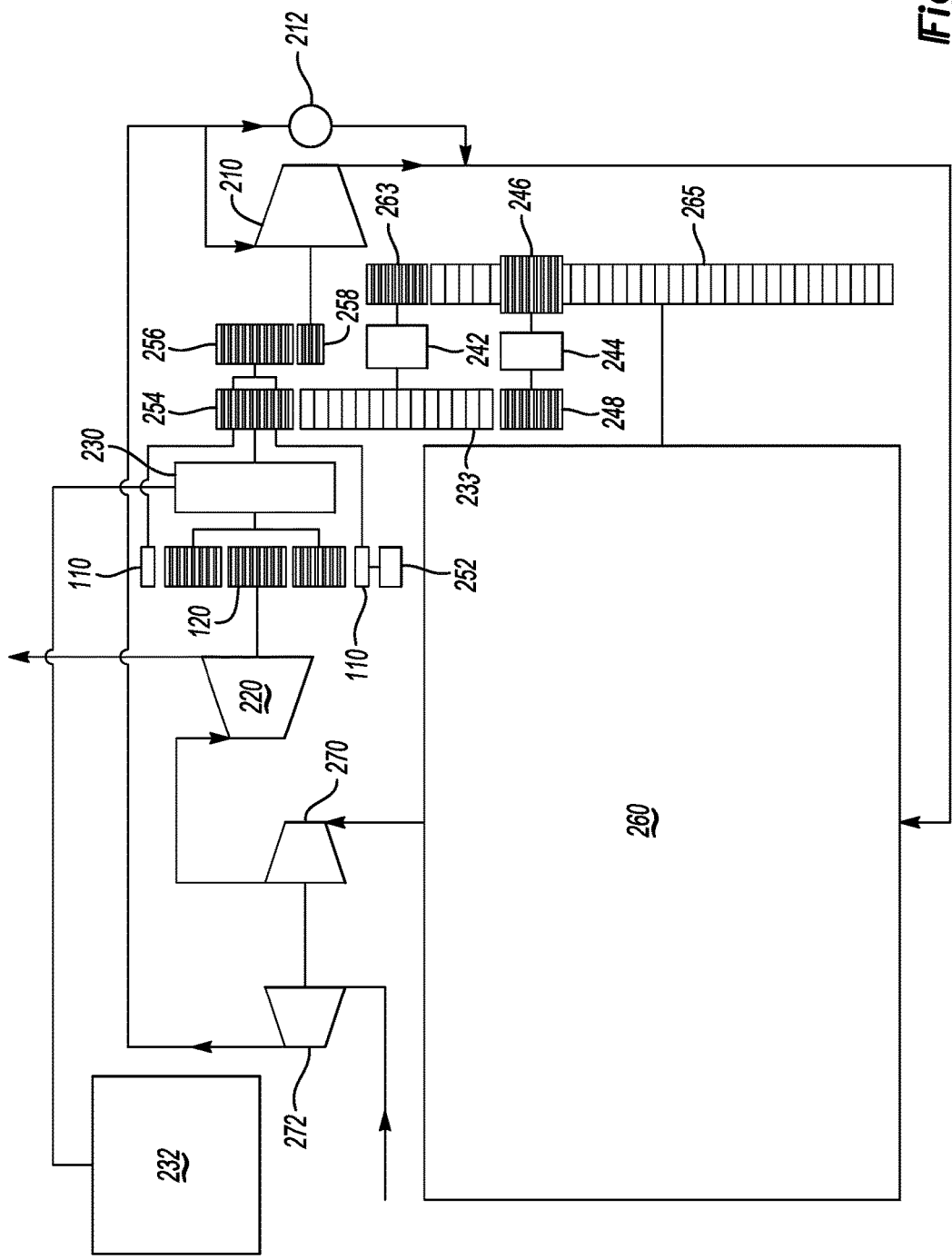
FIG. 11 schematically depicts a system for power integration according to one or more embodiments described and illustrated herein.

Referring now to FIG. 11, embodiments of the system 12 for power integration with additional mechanical linkage components are depicted. Particularly, the system 12 includes a planetary gear system 100, a supercharger compressor 210, a secondary turbine 220 and a hybrid energy device 230. The planetary gear system 100 may include a ring gear 110, a sun gear 120 and a carrier 130. The supercharger compressor 210 may be mechanically coupled to the ring gear 110, the secondary turbine 220 may be mechanically coupled to the sun gear 120 and the hybrid energy device 230 may be mechanically coupled to the carrier 130. The system 12 is configured for an ICE 260 to be mechanically coupled to the carrier 130 and thus also mechanically coupled to the hybrid energy device 230 via a first forward clutch 242 and a first reverse clutch 244. The first forward clutch 242, when engaged, mechanically couples the ICE 260 to the carrier 130 and hybrid energy device 230 in a forward rotational direction. The first reverse clutch 244, when engaged, mechanically couples the ICE 260 with the carrier 130 and hybrid energy device 230 in a reverse rotational direction. When the first forward clutch 242 and first reverse clutch 244 are both disengaged, the ICE is not mechanically coupled to the carrier 130 and hybrid energy device 230. A brake 250 (not shown in FIG. 11) may be included and be mechanically coupled to the ring gear 110, and thus mechanically coupled to the supercharger compressor 210, via a band brake or second clutch 252. That is, when the band brake or second clutch 252 is engaged, the brake 250 is mechanically coupled with the supercharger compressor 210 and the supercharger compressor 210 is prevented from rotating, and when the band brake or second clutch 252 is disengaged, the brake 250 is not mechanically coupled to the supercharger compressor 210 and the supercharger compressor 210 is free to rotate. Positioned between the supercharger compressor 210, secondary turbine 220, hybrid energy device 230, first forward clutch 242, first reverse clutch 244, brake 250 and ICE 260 may be a plurality of gears, shafts, etc., that provide desired gear ratios between various system components. For example and without limitation, positioned between the ring gear 110 and the supercharger compressor 210 may be a central linkage gear 254, a ring linkage gear 256 and a compressor linkage gear 258. Positioned between the carrier 130 and the first forward clutch 242 may be the central linkage gear 254 and a forward clutch gear 233. Positioned between the first forward clutch 242 and the ICE 260 may be a flywheel gear 263 and a flywheel 265. Positioned between the ICE 260 and the first reverse clutch 244 may be a first reverse clutch gear 246. Positioned between the first reverse clutch 244 and the hybrid energy device 230 may be a second reverse clutch gear 248, the forward clutch gear 233 and the central linkage gear 254. The supercharger compressor bypass valve 212 may also be provided to provide a bypass of compressed air from the primary compressor 270.

The above-described system for power integration integrates turbocompounding, waste heat recovery, supercharging and hybridization in one system. The system operates at maximum efficiency and also has a packaging benefit. The system includes a planetary gear system with a compressor on a ring gear, a secondary turbine on a sun gear and an electric motor/generator or variable displacement hydraulic pump on a carrier. The ICE is connected to the carrier via a clutch and the ring gear has a grounding brake. The various components may be directly or indirectly driven by the planetary gear system to adjust operating speeds of all components to an optimum.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:
1. A system for power distribution comprising:
 a planetary gear system comprising a ring gear, a sun gear and a carrier;
 a supercharger compressor mechanically coupled to the ring gear;
 a secondary turbine mechanically coupled to the sun gear;
 an electric motor/generator or a variable displacement hydraulic pump mechanically coupled to the carrier, the-electric motor/generator or a variable displacement hydraulic pump is co-axially aligned with the carrier;
 an internal combustion engine (ICE) mechanically coupled to the electric motor/generator or the variable displacement hydraulic pump through the carrier and a first clutch; and
 a brake mechanically coupled to the ring gear via a band brake wherein the band brake is selectively engaged or disengaged such that the brake is selectively mechanically coupled or decoupled to the supercharger compressor through the ring gear,
 wherein the first clutch is selectively engaged or disengaged such that the ICE is selectively mechanically coupled or decoupled to the electric motor/generator or the variable displacement hydraulic pump, and
 wherein the band brake is selectively engaged or disengaged and the first clutch is selectively engaged or disengaged to provide power from the secondary turbine to the electric motor/generator or the variable displacement hydraulic pump and selectively providing power to either or both of the ICE and the supercharger compressor.

2. The system of claim 1, wherein the system for power distribution has a Mode A comprising:
 the band brake is engaged such that the brake is mechanically coupled to the supercharger compressor; and
 the first clutch is disengaged such that the ICE is not mechanically coupled to the electric motor/generator or the variable displacement hydraulic pump;
 wherein the system for power distribution is configured for the secondary turbine to provide power to the electric motor/generator or the variable displacement hydraulic pump.

3. The system of claim 1, wherein the system for power distribution has a Mode B comprising:
 the band brake is engaged such that the brake is mechanically coupled to the supercharger compressor;
 the first clutch is engaged such that the ICE is mechanically coupled to the electric motor/generator or the variable displacement hydraulic pump;
 wherein the system for power distribution is configured for the secondary turbine to provide power to the electric motor/generator or the variable displacement hydraulic pump and the ICE.

4. The system of claim 1, wherein the system for power distribution has a Mode C comprising:
 the band brake is disengaged such that the brake is not mechanically coupled to the supercharger compressor;
 the first clutch disengaged such that the ICE is not mechanically coupled to the electric motor/generator or the variable displacement hydraulic pump;
 wherein the system for power distribution is configured for the secondary turbine to provide power to the electric motor/generator or the variable displacement hydraulic pump and the supercharger compressor.

5. The system of claim 1, wherein the system for power distribution has a Mode D1 comprising:
the band brake is disengaged such that the brake is not mechanically coupled to the supercharger compressor;
the first clutch is engaged such that the ICE is mechanically coupled to the electric motor/generator or the variable displacement hydraulic pump;
wherein the system for power distribution is configured for the secondary turbine to provide power to the electric motor/generator or the variable displacement hydraulic pump the supercharger compressor and the ICE.

6. The system of claim 2, wherein the first clutch comprises a first forward clutch and a first reverse clutch and the system for power distribution has a Mode D2 comprising:
the band brake is disengaged such that the brake is not mechanically coupled to the supercharger compressor;
the first forward clutch is disengaged and the first reverse clutch engaged such that the ICE is mechanically coupled to the electric motor/generator or the variable displacement hydraulic pump;
wherein the system for power distribution is configured for the secondary turbine to provide power to the electric motor/generator or the variable displacement hydraulic pump and the supercharger compressor, and the ICE is configured to provide power to the electric motor/generator or the variable displacement hydraulic pump and supercharger compressor.

7. The system of claim 1, wherein the secondary turbine is a turbocompounding turbine.

8. The system of claim 1, wherein the secondary turbine is a waste heat recovery turbine.

9. A vehicle having an engine with a system for power integration comprising:
an internal combustion engine (ICE), a supercharger compressor, a secondary turbine and an electric motor/generator or a variable displacement hydraulic pump;
a planetary gear system comprising a ring gear, a sun gear and a carrier, wherein:
the supercharger compressor is mechanically coupled to the ring gear;
the secondary turbine is mechanically coupled to the sun gear;
the electric motor/generator or the variable displacement hydraulic pump is mechanically coupled to the carrier, the electric motor/generator or a variable displacement hydraulic pump is co-axially aligned with the carrier;
the ICE is mechanically coupled to the electric motor/generator or the variable displacement hydraulic pump through a first clutch such that the ICE is engaged or disengaged from the electric motor/generator or the variable displacement hydraulic pump; and
a brake is mechanically coupled to the ring gear via a band brake such that the supercharger compressor is engaged or disengaged with the brake,
wherein the band brake is selectively engaged or disengaged such that the brake is selectively mechanically coupled or decoupled to the supercharger compressor through the ring gear,
wherein the first clutch is selectively engaged or disengaged such that the ICE is selectively mechanically coupled or decoupled to the electric motor/generator or the variable displacement hydraulic pump, and
wherein the band brake is selectively engaged or disengaged and the first clutch is selectively engaged or disengaged and providing power from the secondary turbine to the electric motor/generator or the variable displacement hydraulic pump and selectively providing power to any of the ICE and the supercharger compressor.

10. The engine of claim 9, wherein the first clutch comprises a first forward clutch and a first reverse clutch such that the electric motor/generator or the variable displacement hydraulic pump is forwardly engaged with the ICE through the first forward clutch and the ICE is forwardly engaged with the electric motor/generator or the variable displacement hydraulic pump through the first reverse clutch.

11. The engine of claim 10, wherein the engine has a Mode A comprising:
the band brake engaged such that the brake is mechanically coupled to the supercharger compressor;
the first forward clutch and the first reverse clutch disengaged such that the ICE is not mechanically coupled to the electric motor/generator or the variable displacement hydraulic pump;
wherein the secondary turbine provides power to the electric motor/generator or the variable displacement hydraulic pump.

12. The engine of claim 10, wherein the engine has a Mode B comprising:
the band brake engaged such that the brake is mechanically coupled to the supercharger compressor;
the first forward clutch engaged and the first reverse clutch is disengaged such that the ICE is mechanically coupled to the electric motor/generator or the variable displacement hydraulic pump;
wherein the secondary turbine provides power to the electric motor/generator or the variable displacement hydraulic pump and the ICE.

13. The engine of claim 10, wherein the engine has a Mode C comprising:
the band brake disengaged such that the brake is not mechanically coupled to the supercharger compressor;
the first forward clutch and the first reverse clutch disengaged such that the ICE is not mechanically coupled to the electric motor/generator or the variable displacement hydraulic pump;
wherein the secondary turbine provides power to the electric motor/generator or the variable displacement hydraulic pump and the supercharger compressor.

14. The engine of claim 10, wherein the engine has a Mode D1 comprising:
the band brake disengaged such that the brake is not mechanically coupled to the supercharger compressor;
the first forward clutch engaged and the first reverse clutch disengaged such that the ICE is mechanically coupled to the electric motor/generator or the variable displacement hydraulic pump;
wherein the secondary turbine provides power to the electric motor/generator or the variable displacement hydraulic pump, the supercharger compressor and the ICE.

15. The engine of claim 10, wherein the engine has a Mode D2 comprising:
the band brake disengaged such that the brake is not mechanically coupled to the supercharger compressor;
the first forward clutch disengaged and the first reverse clutch is engaged such that the ICE is mechanically coupled to the electric motor/generator or the variable displacement hydraulic pump;

wherein the secondary turbine provides power to the electric motor/generator or the variable displacement hydraulic pump and the supercharger compressor, and the ICE provides power to the electric motor/generator or the variable displacement hydraulic pump.

16. The engine of claim 9, wherein the secondary turbine is a turbocompounding turbine.

17. The engine of claim 9, wherein the secondary turbine is a waste heat recovery turbine.

18. A system for power distribution comprising:
a planetary gear system comprising a ring gear, a sun gear and a carrier;
a supercharger compressor mechanically coupled to the ring gear;
a secondary turbine mechanically coupled to the sun gear;
an electric motor/generator or a variable displacement hydraulic pump mechanically coupled to the carrier;
an internal combustion engine (ICE) mechanically coupled to the electric motor/generator or the variable displacement hydraulic pump through the carrier and a first clutch; and
a brake mechanically coupled to the supercharger compressor via a band brake, the band brake is engaged such that the brake is mechanically coupled to the supercharger compressor;
the first clutch is disengaged such that the ICE is not mechanically coupled to the electric motor/generator or the variable displacement hydraulic pump,
wherein the system for power distribution is configured for the secondary turbine to provide power to the electric motor/generator or the variable displacement hydraulic pump.

19. A system for power distribution comprising:
a planetary gear system comprising a ring gear, a sun gear and a carrier;
a supercharger compressor mechanically coupled to the ring gear;
a secondary turbine mechanically coupled to the sun gear;
an electric motor/generator or a variable displacement hydraulic pump directly mechanically coupled to the carrier;
an internal combustion engine (ICE) mechanically coupled to the electric motor/generator or the variable displacement hydraulic pump through the carrier and a first clutch; and
a brake mechanically coupled to the supercharger compressor via a band brake, the band brake is engaged such that the brake is mechanically coupled to the supercharger compressor;
the first clutch is engaged such that the ICE is mechanically coupled to the electric motor/generator or the variable displacement hydraulic pump,
wherein the system for power distribution is configured for the secondary turbine to provide power to the electric motor/generator or the variable displacement hydraulic pump and the ICE.

20. A system for power distribution comprising:
a planetary gear system comprising a ring gear, a sun gear and a carrier;
a supercharger compressor mechanically coupled to the ring gear;
a secondary turbine mechanically coupled to the sun gear;
an electric motor/generator or a variable displacement hydraulic pump directly mechanically coupled to the carrier;
an internal combustion engine (ICE) mechanically coupled to the electric motor/generator or the variable displacement hydraulic pump through the carrier and a first clutch; and
a brake mechanically coupled to the supercharger compressor via a band brake, the band brake is disengaged such that the brake is not mechanically coupled to the supercharger compressor;
the first clutch disengaged such that the ICE is not mechanically coupled to the electric motor/generator or the variable displacement hydraulic pump,
wherein the system for power distribution is configured for the secondary turbine to provide power to the electric motor/generator or the variable displacement hydraulic pump and the supercharger compressor.

21. A system for power distribution comprising:
a planetary gear system comprising a ring gear, a sun gear and a carrier;
a supercharger compressor mechanically coupled to the ring gear;
a secondary turbine mechanically coupled to the sun gear;
an electric motor/generator or a variable displacement hydraulic pump directly mechanically coupled to the carrier;
an internal combustion engine (ICE) mechanically coupled to the electric motor/generator or the variable displacement hydraulic pump through the carrier and a first clutch, the first clutch comprises a first forward clutch and a first reverse clutch; and
a brake mechanically coupled to the supercharger compressor via a band brake, the band brake is disengaged such that the brake is not mechanically coupled to the supercharger compressor;
the first forward clutch is disengaged and the first reverse clutch engaged such that the ICE is mechanically coupled to the electric motor/generator or the variable displacement hydraulic pump,
wherein the system for power distribution is configured for the secondary turbine to provide power to the electric motor/generator or the variable displacement hydraulic pump and the supercharger compressor, and the ICE is configured to provide power to the electric motor/generator or the variable displacement hydraulic pump and supercharger compressor.

* * * * *